US006756142B2

United States Patent
Muthuswamy et al.

(10) Patent No.: US 6,756,142 B2
(45) Date of Patent: Jun. 29, 2004

(54) FUEL CELL USING NON-LINEAR POSITIVE TEMPERATURE COEFFICIENT MATERIAL

(75) Inventors: Sivakumar Muthuswamy, Plantation, FL (US); Steven D. Pratt, Plantation, FL (US); Ronald J. Kelley, Coral Springs, FL (US)

(73) Assignee: Motorola, Inc., Schaumburg, IL (US)

(*) Notice: Subject to any disclaimer, the term of this patent is extended or adjusted under 35 U.S.C. 154(b) by 437 days.

(21) Appl. No.: 09/999,387

(22) Filed: Oct. 31, 2001

(65) Prior Publication Data

US 2003/0082420 A1 May 1, 2003

(51) Int. Cl.[7] .............................................. H01M 8/04
(52) U.S. Cl. ..................................................... 429/24
(58) Field of Search ................................... 429/22–24

(56) References Cited

U.S. PATENT DOCUMENTS

| 5,858,567 A | | 1/1999 | Spear, Jr. et al. | |
| 5,910,378 A | * | 6/1999 | Debe et al. | 429/42 |
| 6,156,184 A | | 12/2000 | Antonucci et al. | |
| 6,183,668 B1 | * | 2/2001 | Debe et al. | 252/510 |
| 6,207,312 B1 | | 3/2001 | Wynne et al. | |
| 6,613,106 B1 | * | 9/2003 | Debe et al. | 29/623.3 |

OTHER PUBLICATIONS

"Synthesis and Swelling Characteristics of pH and Thermo–responsive Interpenetrating Polymer Network Hydrogel Composed of Poly(vinyl alcohol) and Poly(acrylic acid)" Young Moo Lee, Su Hwi Kim, and Chong Soo Choo, Department of Industrial Chemistry, College of Engineering, Hanyang University, Seoul Korea pp. 301–311.

"Separation of Organic Substances with Thermo–Responsive Poolymer Hydrogel"by Hisao Ichijo, Ryoichi Kishi, Okihiko Hirasa, Polymer Gels and Networks 2 (1994) pp. 315–322.

* cited by examiner

Primary Examiner—Mark Ruthkosky
(74) Attorney, Agent, or Firm—Randi L. Karpinia

(57) ABSTRACT

A fuel cell (200) includes a membrane electrode assembly (210) located together with a layer of porous, z-axis electrically conductive, non-linear positive temperature coefficient (NPTC) material (250). The NPTC material (250) operates to selectively limit the amount of electrons collected from localized areas of the membrane electrode assembly (210) in order to reduce hot spots.

15 Claims, 4 Drawing Sheets

FUEL CELL USING NON-LINEAR POSITIVE TEMPERATURE COEFFICIENT MATERIAL

TECHNICAL FIELD

This invention relates in general to fuel cells, and more particularly to a system for controlling hot spots that tend to occur on fuel cell membrane electrode assemblies.

BACKGROUND

In recent years, nearly all electronic devices have been reduced in size and made lightweight, in particular portable electronic devices. This advancement has been made possible, in part, by the development of new battery chemistries such as nickel-metal hydride, lithium ion, zinc-air, and lithium polymer, that enable larger amounts of power to be packaged in a smaller container. These secondary or rechargeable batteries need to be recharged upon depletion of their electrical capacity. This is typically performed by connecting the battery to a battery charger that converts alternating current to a low level direct current of 2–12 volts. The charging cycle typically lasts a minimum of 1–2 hours, and more commonly 4–14 hours. Although the new batteries are a tremendous advancement over the previous generations of batteries, they still suffer from the need for sophisticated charging regimens and the slow charging rates.

Fuel cells are expected to be the next major source of energy for portable electronic products. Simply put, fuel cells catalytically convert a hydrogen molecule to hydrogen ions and electrons, and then extract the electrons through a membrane as electrical power, while oxidizing the hydrogen ions to $H_2O$ and extracting the byproduct water. The tremendous advantage of fuel cells is the potential ability to provide significantly larger amounts of power in a small package, as compared to a battery. Their potential ability to provide long talk-times and standby times in portable electronic device applications are driving miniaturization of fuel cell technologies. The polymer electrolyte membrane (PEM) based air-breathing, dead-ended fuel cells are ideally suited for powering portable communication devices. One of they key operating challenges in a small dead-ended fuel cell system is the temperature regulation at different points on the cells. Since these fuel cells do not have forced gas circulation or external membrane water management systems, the distribution of fuel gas and water over the area of the membrane electrode assembly (MEA) of the fuel cell will be non-uniform. This non-uniform distribution has the potential to create significant hot spots which can destroy the MEA and hence the performance of the fuel cells.

In a dead-ended air-breathing hydrogen/air fuel cell, the electrolyte membrane would have a tendency to dehydrate when it is operated at a relatively high current. As the membrane dries, the internal resistance of the cell increases, and the power output of the cell is substantially reduced. Undesirably, this drying out can progressively march across the PEM until the fuel cell fails completely. The increase in internal resistance produces $I^2R$ heating which develops into "hot spots". Though prior art technologies exist to control some sources of hot spots, there is no practical prior art technique that will significantly eliminate the probability of encountering hot spot conditions. In addition, the prior art methods use active systems, that require external components, which are not practical for a portable fuel cell based power source. Most of the prior art methods focus on membrane hydration and water management methods to prevent the creation of hot spots. For example, U.S. Pat. Nos. 5,858,567, 6,156,184, and 6,207,312 teach various techniques for membrane hydration. These methods are based on an approach which attempts to keep the entire electrolyte membrane hydrated at high enough level to survive the highest level of current density without drying out the membrane. In addition, hot spots can be caused by factors other than electrolyte membrane dehydration such as poor distribution of fuel gases. The prior art methods are cumbersome and are not fail-proof; they can fail for a variety of reasons including non-uniformity of membrane material, aging of the materials and localized variations in concentration of fuel gas. In addition, maintaining a high level of hydration to keep the entire electrolyte membrane fully hydrated can cause flooding on the cathode side of the fuel cell. Therefore, a better approach is needed for controlling hot spots in fuel cell systems.

DETAILED DESCRIPTION OF THE PREFERRED EMBODIMENT

A method and apparatus for passively controlling creation and growth of hot spots in a fuel cell system is disclosed. A typical fuel cell based power source has many unit fuel cells that are connected to a each other in series. Each of the fuel cells has a membrane electrode assembly which consists of an electrolyte layer, a cathode and an anode disposed on either side of the electrolyte layer. The fuel cell also has a gas diffusion layer (GDL) and a current collector on each side of the MEA. The current collector gathers the free electrons produced during the electrochemical reaction. In a dead-ended air-breathing hydrogen/air fuel cell, the electrolyte membrane would have a tendency to dehydrate when it is operated at a relatively high current. As the membrane dries, the internal resistance of the cell increases, increasing $I^2R$ heating which develops into "hot spots". Hot spots can also be caused by poor distribution of fuel gases, high concentration of fuel gas at localized areas, runaway reaction at some areas of the MEA and localized shorting of the cell. One way to avoid progressive degradation from hot spot initiation to a complete failure of the MEA is to electrically isolate the hot area so that very little current is drawn through that area. This will eliminate $I^2R$ heating in that area and allow that area to recover and rehydrate.

Figure 1:
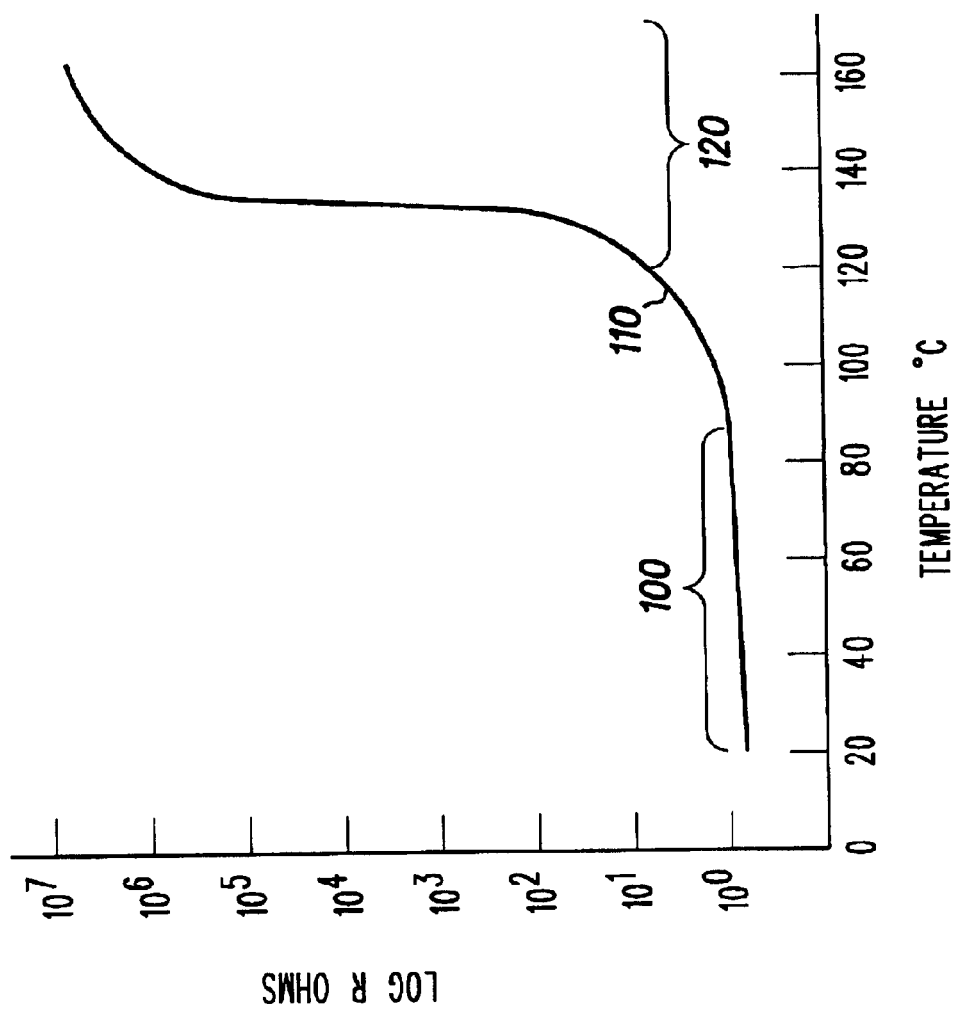
FIG. 1 is a schematic representation of the resistance-temperature relationship for a non-linear positive temperature coefficient material.

Materials that respond to increase in temperature with increased electrical resistance are said to exhibit positive temperature coefficient (PTC) behavior. One class of PTC materials called non-linear positive temperature coefficient (NPTC) materials, exhibit a unique resistance versus temperature characteristic, maintaining a low resistance over a wide temperature range, then dramatically increasing the resistance (several orders of magnitude) above a specific temperature called the "Curie" or "switching" point. This critical temperature increase can be caused by internal heat due to electrical current flow ($I_2R$ loss) or from external ambient temperature rise. Removing the heat source allows the NPTC material to cool, returning it to its initial base resistance. FIG. 1 schematically shows the non-linear relationship between resistance and temperature for a typical NPTC material. In the figure, first-part 100 of the curve shows the region of low resistance which is the normal operating state of the NPTC material. The "Curie" point 110 and the high-resistance region 120 are also shown in the figure.

The electrical resistivity of NPTC materials along the three principal directions (X, Y, Z) can be custom tailored by appropriate selection of base materials, conductive fillers and dopants. NPTC materials, in sheet form, that have very low electrical resistivity along its thickness direction (Z) and very high electrical resistivity along the other two directions (X and Y) are said to exhibit Z-axis conductivity. The Z-axis conducting NPTC materials used in various embodiments of this invention have a porous structure to allow fuel cell reactants to pass through them. In addition, the porous structure improves the Z-axis conductivity while significantly reducing its X and Y direction conductivity. In different embodiments of the present invention, a layer of porous Z-axis conductive NPTC material is disposed between one or more layers of the fuel cell of the prior art to control the amount of current drawn through different locations on the fuel cell MEA thus controlling the $I_2R$ heating at localized areas of the MEA.

A method of operating a fuel cell, having a membrane electrode assembly, involves selectively limiting the quantity of electrons collected from localized areas of the MEA surface. Selective limiting of the quantity of electrons collected from localized areas of the MEA is realized by a layer of NPTC material located together with the membrane electrode assembly or the current collector of the fuel cell. The Z-axis electrical resistivity of the NPTC material at localized areas on the NPTC material layer changes from a low value to a high value in response to a trigger condition, on the MEA side adjacent to the NPTC material layer. A trigger condition is created when one or more of the parameters, indicating the state of local areas of the MEA, cross a threshold value. Some of the parameters that are appropriate trigger initiators are temperature, pH, hydrogen concentration, electrolyte water content, electrolyte thickness, electrolyte ionic conductivity and electrolyte electronic conductivity at local areas of the MEA.

Figure 2:
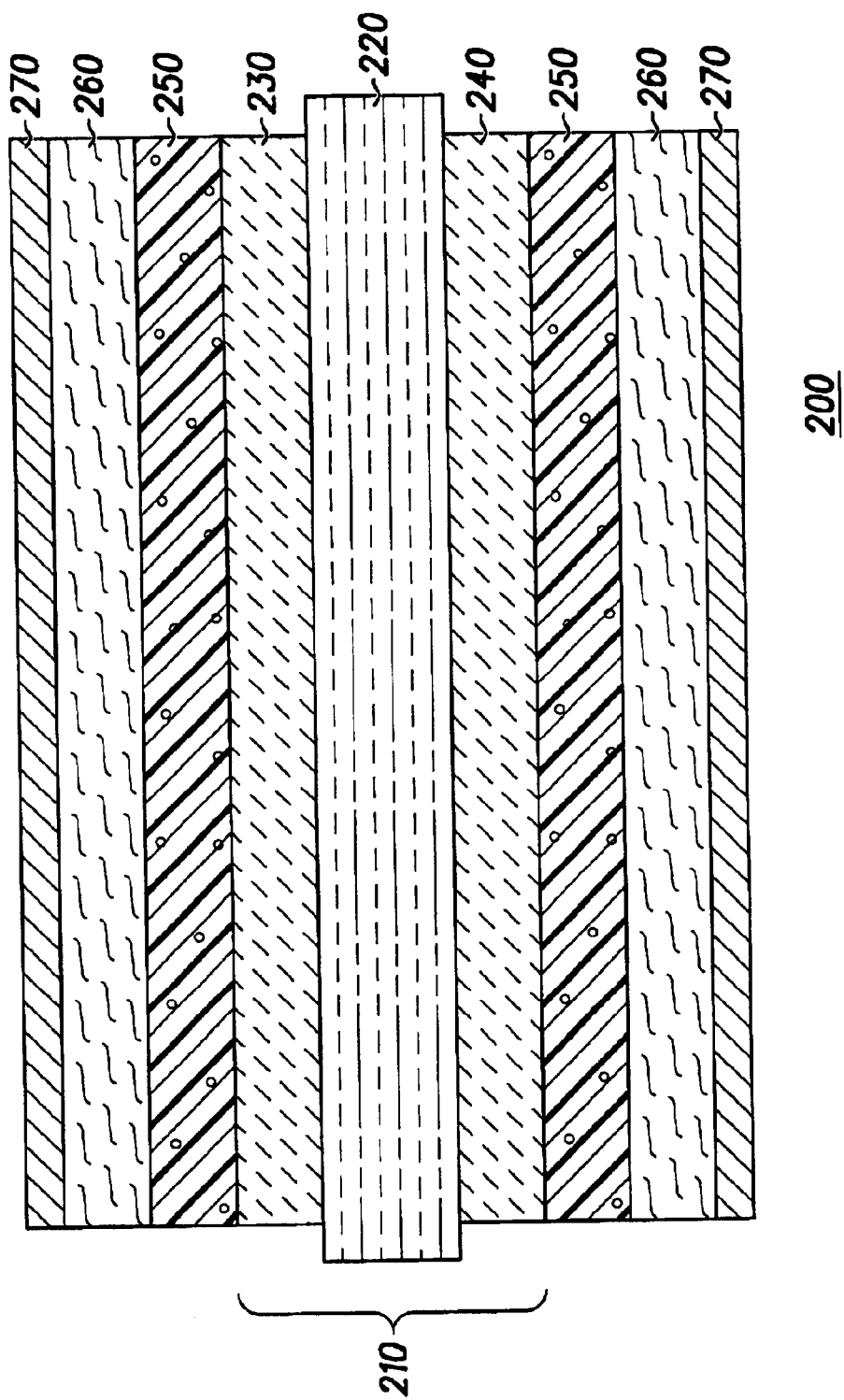
FIG. 2 illustrates a fuel cell according to a first embodiment of the present invention.

FIG. 2 shows a schematic view of one embodiment of the present invention. The apparatus consists of a single fuel cell unit 200 having a membrane electrode assembly 210 having two opposing major sides. The membrane electrode assembly comprises an electrolyte 220 disposed between and in intimate contact with an anode 230 and a cathode 240. The contact surface between the electrolyte 220, and the electrodes 230, and 240 are coated with noble metal catalysts such as platinum black. A layer of porous, Z-axis conducting NPTC material 250 is disposed on either side of the MEA and in intimate contact with the opposing major surfaces of the MEA. Further, a gas diffusion layer (GDL) 260 is disposed on the surfaces of the NPTC layer that is opposite to the one in contact with the MEA. A current collector layer 270 is disposed on the GDL layer that is opposite to the one in contact with the NPTC layer. During fuel cell operation, the hydrogen molecule dissociates at the electrolyte/catalyst interface into hydrogen ions, $H^+$, and electrons, $e^-$. The hydrogen ions migrate from the anode side to the cathode side through the electrolyte and the electrons flow around the external electrical load to the cathode side. The electrons generated at the electrolyte/catalyst interface migrate through the anode, NPTC and GDL layers and are gathered together by the current collector and channeled to an electrical terminal connected to the external electrical load.

While the fuel cell operates, many different conditions such as poor distribution of fuel gases, high concentration of fuel gas at localized areas, runaway reaction at some areas of the MEA, localized dehydration of the electrolyte, and localized shorting of the cell can cause hot spots. A hot spot caused by any of the conditions manifests itself as rapid, localized heating of the MEA. In an embodiment of the present invention, when any part of the MEA begins to heat up creating a potential condition for hot spot development, the area of NPTC material adjacent to the MEA starts to heat up. Through appropriate selection of the NPTC material, the "Curie" point can be tailored to be below the temperature at which hot spots will inhibit the performance of the fuel cell. At this condition, the Z-axis electrical resistivity of the NPTC layer at areas where the temperature is over the "Curie" point will be very high. This significantly reduces the quantity of electrons flowing through that area of the NPTC layer virtually shutting off current flow in those local areas. The reduced current flow results in a substantial reduction in the reaction rate at areas of electrolyte/catalyst interface adjacent to the shut-off NPTC areas, ultimately halting the formation of hot spots and decreasing local surface temperature. Once the temperature of the local areas of the NPTC layer drops below the "Curie" point, electrical resistivity returns to its normal value and the reaction progresses as before. This regulation of current flow through local areas of the NPTC layer is fully reversible, completely passive and self-regulating.

Some of the common classes of NPTC materials that are appropriate for use in various embodiments of the invention are polymer positive temperature coefficient (PPTC) materials, ceramic positive temperature coefficient (CPTC) materials and semiconducting positive temperature coefficient (SPTC) materials. The material selected for a particular embodiment or application will depend on the choice of MEA materials and their construction, the choice of GDL materials and the operating characteristics of the fuel cell. A typical polymer NPTC layer comprises a polymer matrix that is loaded with carbon black particles to make it conductive. As a local area of the PPTC layer begins to heat up, the polymer matrix will expand and the carbon particles will separate increasing the Z-axis resistance of the area. This will cause the area to heat faster and expand more, further raising the resistance. When the temperature of the area reaches the Curie point, the resistance increases dramatically, substantially reducing the current flow through the local area of the PPTC layer. As the local area cools, polymer matrix contracts to its original shape and reconnects the carbon particles thus lowering the resistance of the area to a normal level. The initial resistance, the trip resistance and the Curie point temperature of PPTC materials can be custom tailored for each application. Typical commercial PPTC materials that are appropriate for use in various embodiments of the present invention have an initial Z-axis resistivity of the order of 1E-5 Ohm-meter which approximately remains constant until the Curie point is reached, at which time the resistivity rapidly increases at least by a factor of 10.

Figure 3:
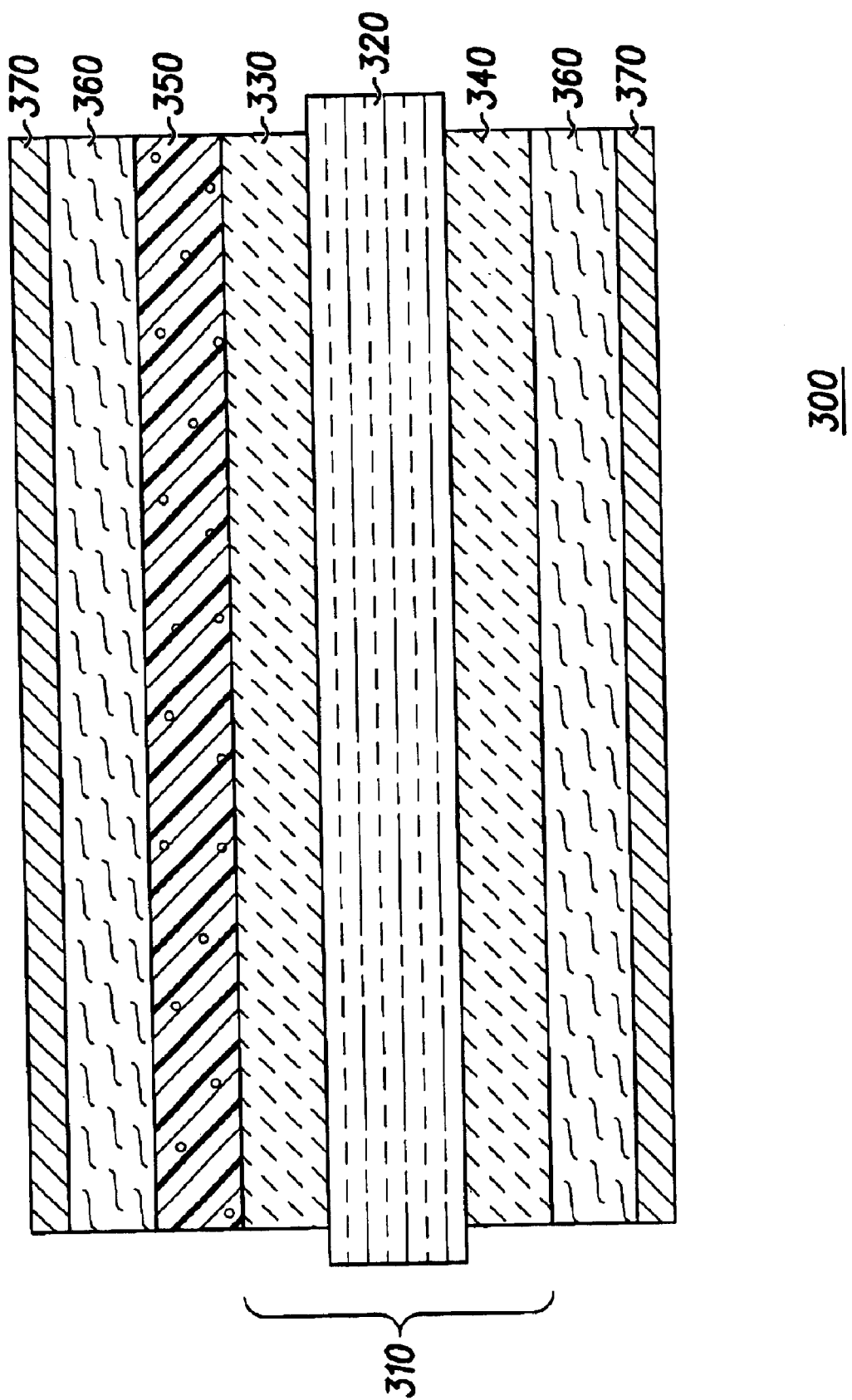
FIG. 3 is a schematic representation of a fuel cell according to a second embodiment of the present invention.

Although the first embodiment describes an apparatus that has porous Z-axis conducting NPTC material disposed on both sides of the MEA, other variations can be realized by disposing the NPTC material only on the anode or the cathode side of the MEA. Since the anode side of a hydrogen fuel cell is more prone to developing hot spots, it may be more beneficial to dispose the NPTC material only on the anode side of the MEA. A second embodiment of the present invention that addresses this concern is schematically shown in FIG. 3. The system consists of a single fuel cell unit 300 having a membrane electrode assembly 310 having two opposing major sides. The membrane electrode assembly comprises an electrolyte 320 disposed between and in intimate contact with an anode 330 and a cathode 340. The contact surface between the electrolyte 320, and the electrodes 330, and 340 are coated with noble metal catalysts such as platinum black. A layer of porous, Z-axis conducting NPTC material 350 is disposed on the anode side of the MEA and in intimate contact with the anode surface of the MEA. Further, a GDL 360 is disposed on the surface of the NPTC layer that is opposite to the one in contact with the MEA on the anode side, and on the cathode surface on the cathode side. A current collector layer 370 is disposed on the GDL layer. When any part of the MEA 310 begins to heat up creating a potential condition for hot spot development, the area of NPTC material adjacent to the MEA on the anode side starts to heat up. At this condition, the Z-axis electrical resistivity of the NPTC layer at areas where the temperature is over the "Curie" point will be very high. This significantly reduces the quantity of electrons flowing through that area of the NPTC layer virtually shutting off current flow in those local areas. The reduced current flow results in a substantial reduction in the reaction rate at areas of electrolyte/catalyst interface adjacent to the shut-off NPTC areas, ultimately halting the formation of hot spots and decreasing local surface temperature. Once the temperature of the local areas of the NPTC layer drops below the "Curie" point, electrical resistivity returns to its normal value and the reaction progresses as before.

Figure 4:
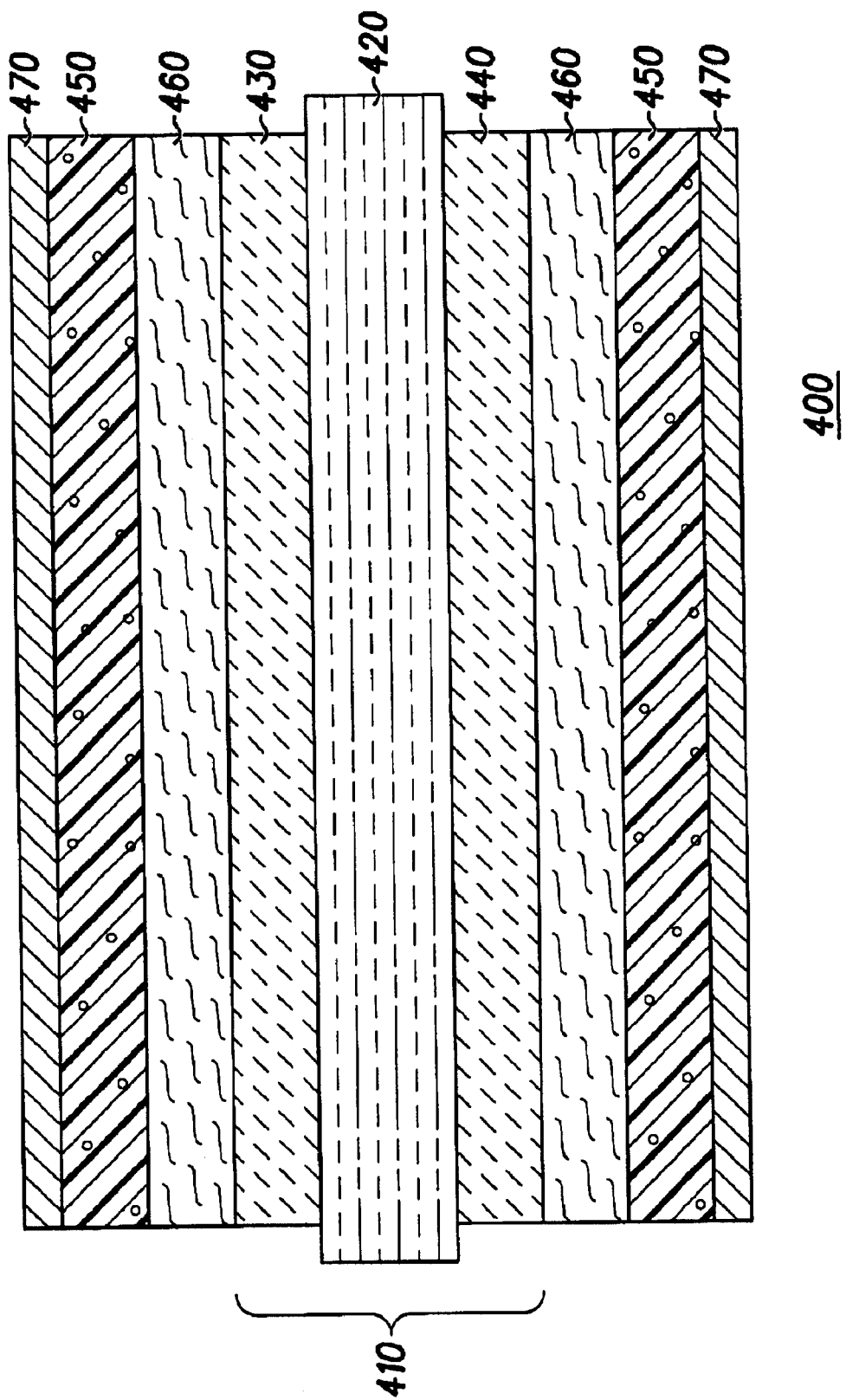
FIG. 4 is a schematic representation of a fuel cell according to a third embodiment of the present invention.

FIG. 4 shows a schematic view of another embodiment of the present invention. The system consists of a single fuel cell unit 400 having a membrane electrode assembly 410 having two opposing major sides. The membrane electrode assembly comprises an electrolyte 420 disposed between and in intimate contact with an anode 430 and a cathode 440. The contact surface between the electrolyte and the electrodes are coated with noble metal catalysts such as platinum black. A GDL 460 is disposed on either side of the MEA and in intimate contact with the opposing major surfaces of the MEA. A GDL material exhibiting Z-axis conductivity is used in this embodiment. Further, a layer of porous, Z-axis conducting NPTC material 450 is disposed on the surfaces of the GDL layer that is opposite to the one in contact with the MEA. A current collector layer 470 is disposed on the NPTC layer that is opposite to the one in contact with the GDL layer.

A novel fuel cell design that passively regulates the quantity of electrons collected at different areas of active surface of a fuel cell based on the localized MEA surface condition is disclosed. For example, by interposing a porous, Z-axis conductive NPTC material between one or more layers of the fuel cell membranes and through selection of NPTC materials with appropriate "Curie" point for a given application, significant reduction in hot spot failures can be realized. The novel configuration also maintains the regulation latched until the temperature drops below a threshold, so that "hot spots" are eliminated from the active surface. This approach of using an inherent property of NPTC materials results in a system that passively controls creation and growth of hot spots in a fuel cell while overcoming the disadvantages of the prior art methods and devices of this general type.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A fuel cell, comprising:
    a membrane electrode assembly; and
    a layer of Z-axis electrically conductive, positive temperature coefficient material located together with the membrane electrode assembly;
    wherein Z-axis electrical resistivity of the positive temperature coefficient material at localized areas on the positive temperature coefficient material layer changes from a first value to a second value in response to a trigger condition at corresponding areas on the membrane electrode assembly adjacent to the positive temperature coefficient material layer.

2. The fuel cell as described in claim 1, further comprising a current collector, wherein the positive temperature coefficient material layer is interposed between the current collector and the membrane electrode assembly.

3. The fuel cell as described in claim 1, further comprising a gas diffusion layer and a current collector, wherein the positive temperature coefficient material layer is interposed between the gas diffusion layer and the membrane electrode assembly and the gas diffusion layer is interposed between the positive temperature coefficient material layer and the current collector.

4. The fuel cell as described in claim 1, further comprising a Z-axis electrically conductive gas diffusion layer and a current collector, wherein the Z-axis electrically conductive gas diffusion layer is interposed between the positive temperature coefficient material layer and the membrane electrode assembly and the positive temperature coefficient material layer is interposed between the Z-axis electrically conductive gas diffusion layer and the current collector.

5. The fuel cell as described in claim 1, wherein the positive temperature coefficient material is selected from the group consisting of polymer positive temperature coefficient materials, ceramic positive temperature coefficient materials and semiconducting positive temperature coefficient materials.

6. The fuel cell as described in claim 1, wherein the trigger condition is created in response to a combination of one or more elements selected from the group consisting of temperature, pH, hydrogen concentration, electrolyte water content, electrolyte thickness, electrolyte ionic conductivity and electrolyte electronic conductivity of the membrane electrode assembly adjacent to the positive temperature coefficient material layer, crossing a threshold value.

7. A fuel cell, comprising:
    a membrane electrode assembly; and
    a layer of porous, Z-axis electrically conductive, non-linear positive temperature coefficient material located together with the membrane electrode assembly;
    wherein Z-axis electrical resistivity of the non-linear positive temperature coefficient material at localized areas on the non-linear positive temperature coefficient material layer changes from a low value to a high value in response to a rise in temperature at corresponding areas on the membrane electrode assembly adjacent to the non-linear positive temperature coefficient material layer, over a threshold value.

8. The fuel cell of claim 7, further comprising a current collector, wherein the non-linear positive temperature coefficient material layer is interposed between the current collector and the membrane electrode assembly.

9. The fuel cell of claim 7, further comprising a gas diffusion layer and a current collector, wherein the non-linear positive temperature coefficient material layer is interposed between the gas diffusion layer and the membrane electrode assembly and the gas diffusion layer is interposed between the non-linear positive temperature coefficient material layer and the current collector.

10. The fuel cell of claim 7, further comprising a Z-axis electrically conductive gas diffusion layer and a current collector, wherein the Z-axis electrically conductive gas diffusion layer is interposed between the non-linear positive temperature coefficient material layer and the membrane electrode assembly and the non-linear positive temperature coefficient material layer is interposed between the Z-axis electrically conductive gas diffusion layer and the current collector.

11. The fuel cell of claim 7, wherein the non-linear positive temperature coefficient material is selected from the group consisting of polymer positive temperature coefficient materials, ceramic positive temperature coefficient materials and semiconducting positive temperature coefficient materials.

12. A fuel cell, comprising:
 a membrane electrode assembly, comprising a solid electrolyte disposed between and in intimate contact with an anode forming first major side of the membrane electrode assembly and a cathode forming second major side of the membrane electrode assembly; and
 a layer of porous, Z-axis electrically conductive non-linear positive temperature coefficient material disposed on and in intimate contact with at least one of the major sides of the membrane electrode assembly;
 wherein the Z-axis electrical resistivity of the non-linear positive temperature coefficient material at localized areas on the non-linear positive temperature coefficient material layer changes from a low value to a high value in response to a rise in temperature at corresponding areas on the membrane electrode assembly side in contact with the non-linear positive temperature coefficient material layer, above a threshold value;
 wherein the Z-axis electrical resistivity change of the non-linear positive temperature coefficient material at localized areas on the non-linear positive temperature coefficient material layer is reversed by a decrease in temperature at corresponding areas on the membrane electrode assembly side in contact with the non-linear positive temperature coefficient material layer, below a threshold value.

13. The fuel cell as described in claim 12, further comprising a current collector, wherein the non-linear positive temperature coefficient material layer is interposed between the current collector and the membrane electrode assembly.

14. The fuel cell as described in claim 12, further comprising a gas diffusion layer and a current collector, wherein the non-linear positive temperature coefficient material layer is interposed between the gas diffusion layer and the membrane electrode assembly and the gas diffusion layer is interposed between the non-linear positive temperature coefficient material layer and the current collector.

15. The fuel cell as described in claim 12, wherein the non-linear positive temperature coefficient material is selected from the group consisting of polymer positive temperature coefficient materials, ceramic positive temperature coefficient materials and semiconducting positive temperature coefficient materials.

* * * * *